United States Patent [19]

Read

[11] Patent Number: 6,035,072
[45] Date of Patent: Mar. 7, 2000

[54] MAPPING DEFECTS OR DIRT DYNAMICALLY AFFECTING AN IMAGE ACQUISITION DEVICE

[76] Inventor: Robert Lee Read, 2315 Crestview Ave., Edinburg, Tex. 78539

[21] Appl. No.: 08/986,925

[22] Filed: Dec. 8, 1997

[51] Int. Cl.[7] ............................. G06K 9/40; H04N 1/409; H04N 5/217
[52] U.S. Cl. ........................... 382/275; 358/463; 348/241
[58] Field of Search ........................... 382/275, 260, 382/261, 254, 149, 141; 358/463, 448, 474, 406, 496, 483, 482; 348/125, 241, 246, 248, 249, 250, 251

[56] References Cited

U.S. PATENT DOCUMENTS

| | | |
|---|---|---|
| 4,748,507 | 5/1988 | Gural . |
| 5,017,963 | 5/1991 | Tuhro . |
| 5,033,095 | 7/1991 | Marcantonio . |
| 5,214,470 | 5/1993 | Denber . |
| 5,327,247 | 7/1994 | Osborne et al. ......................... 348/251 |
| 5,335,290 | 8/1994 | Cullen et al. . |
| 5,436,979 | 7/1995 | Gray et al. ............................. 382/254 |
| 5,442,462 | 8/1995 | Guissin . |
| 5,526,040 | 6/1996 | Foley ..................................... 348/96 |
| 5,623,558 | 4/1997 | Billawala et al. . |
| 5,625,413 | 4/1997 | Katoh et al. . |
| 5,647,021 | 7/1997 | Baird et al. . |
| 5,694,228 | 12/1997 | Peairs et al. ........................... 358/448 |
| 5,815,607 | 9/1998 | Miura ..................................... 382/275 |
| 5,930,008 | 7/1999 | Nabeshima et al. .................... 358/496 |

Primary Examiner—Scott Rogers

[57] ABSTRACT

Defects such as dirt, dust, scratches, blemishes, pits, or defective elements or pixels in a CCD, scanner, photocopier, or image acquiring device are dynamically detected by processing a plurality of images via a computer. A pristine object of calibration is not required. Stationary components of the video images are found and detected so as to produce a low false alarm probability. Text segmentation and measurement of total deviation based on variability related to high-frequency components of the video image are employed to prevent applying the process or method to printed text or graphics. Additional techniques optionally employed are median filtering, sample area detection, and dynamic adjustment of scores. In special cases, only moderately blank documents are used. The dynamic defect detection allows defect compensation, defect correction, and alerting the operator of defects.

20 Claims, 8 Drawing Sheets

Fig. 1
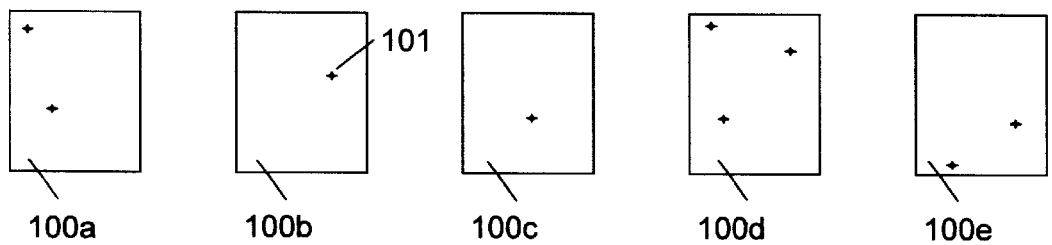
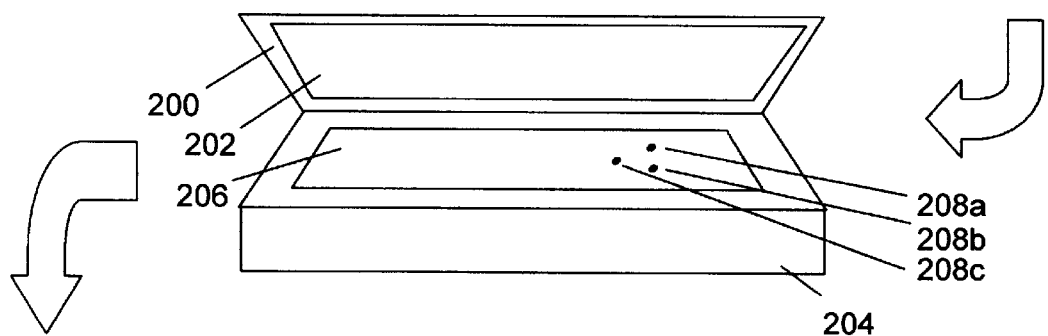
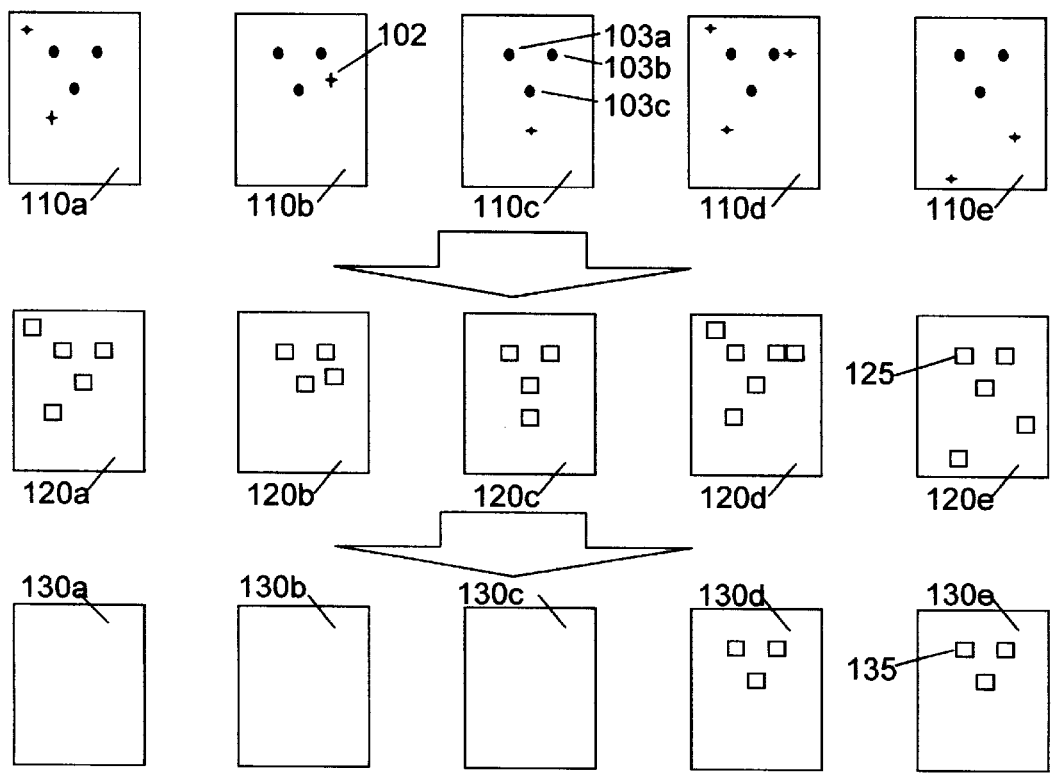

Fig. 4
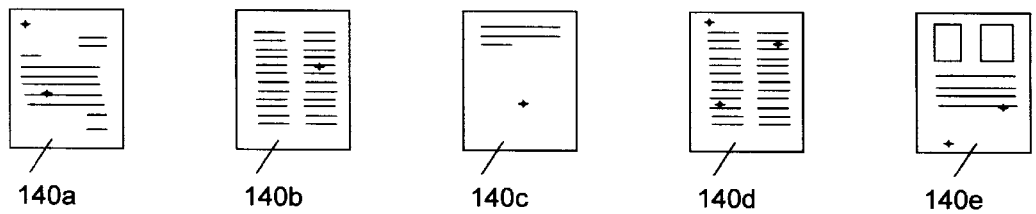
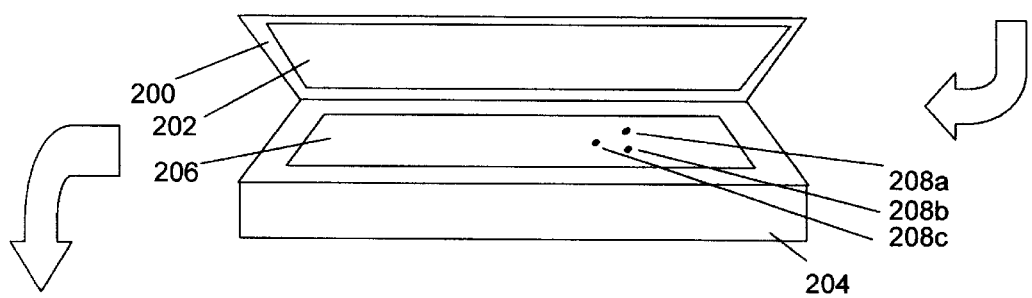
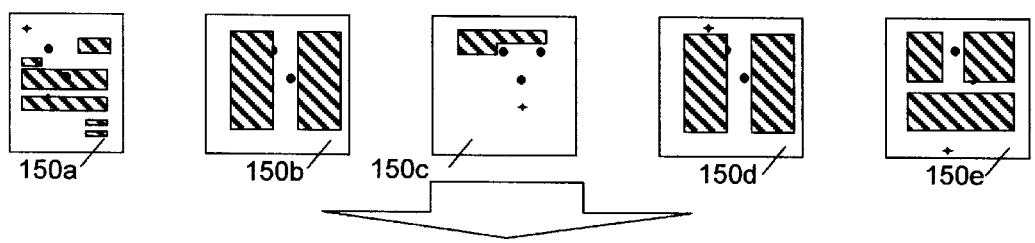
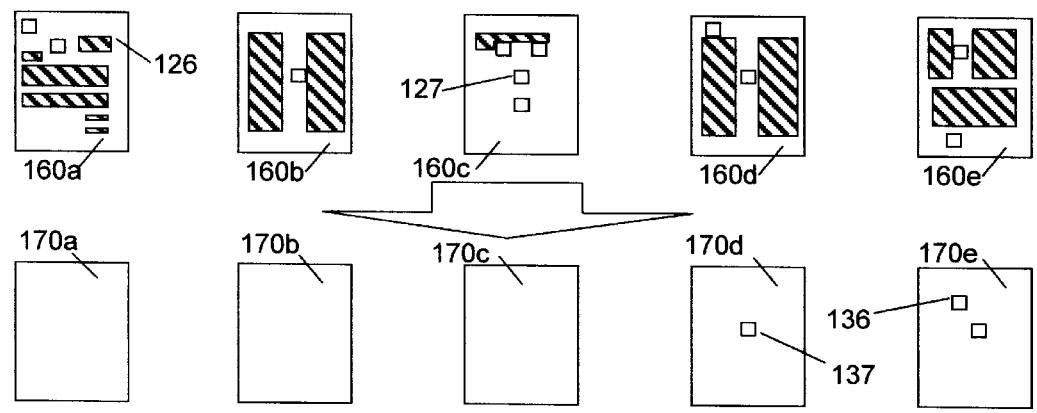

6,035,072

MAPPING DEFECTS OR DIRT DYNAMICALLY AFFECTING AN IMAGE ACQUISITION DEVICE

1 BACKGROUND—FIELD OF INVENTION

This invention relates to image forming devices such as video cameras, scanners, and photocopiers, specifically identifying dust and other defects corrupting such systems.

2 BACKGROUND—DISCUSSION OF PRIOR ART

Photocopiers get dirty. This degrades the quality of the images they produce. In scanners and photocopiers this problem is exacerbated by the fact that the lens, or glass, of such instruments is in direct contact with documents and samples which are somewhat abrasive. Even worse, since the focal plane of such instruments is right at the glass, any dust or scratch obliterates a portion of the scanned image.

One way of detecting defects such as a scratch or dust speck on a photocopier platen is to acquire an image through that platen of a perfect target or reference image, such as a solidly white piece of plastic that has no scratches, dents or dust particles itself. A method for doing this was disclosed in U.S. Pat. No. 5,214,470 to Denber (1993). However, in many typical work environments any such reference image, such as a piece of white plastic attached to the cover or lid of the photocopier or scanner, is likely to receive just as much dust and abrasion as the platen or lens of the photocopier. Maintaining a perfect reference target requires laborious care. A perfect reference target may even be difficult to manufacture. However, any imperfection in the reference target will be interpreted as a defect by Denber's method.

U.S. Pat. No. 5,623,558 to Billawala et al. (1997) discloses a method of correcting a scanned image in pixel locations predetermined to be defective. However, it does not suggest or teach a method for discovering such pixels beyond Denber.

Approaches similar to Denber's but relating to charge-coupled device (CCD) based video cameras are taught in U.S. Pat. No. 5,416,516 to Kameyama et al. (1995) and U.S. Pat. No. 5,625,413 to Katoh et al. (1997). However, in so far as these teach method of identify faulty regions in two-dimensional devices, these patents are similar to Denber's in that they rely on a unique, perfect reference image. In the case of video cameras, the iris is closed creating a perfectly black image against which some kinds of defects can be measured. This, however, necessitates closing the iris, and can only detect "white spot" defects.

U.S. Pat. No. 4,748,507 to Gural (1988) discloses an interesting approach of shifting the imaged object relative to the imaging device so that a given portion of the image is unlikely to be imaged twice by defective pixels, allowing circuitry to correct the defects. However, this is cumbersome for typical operations, requiring at the very least machinery to shift the target or the imaging device.

Finally, a well known technique for dealing with defects in portions of the image is to smooth or filter the image in some general way, exemplified by U.S. Pat. No. 5,442,462 to Guissin (1995). Such techniques may greatly improve the subjective quality of the constructed image to a human viewer. However, they only do so by smearing the image to a greater or lesser degree, and this may be unacceptable for applications wherein a processing system attempts to compute something from the image. Further, such smoothing and filtering techniques will work better when the position of defects is predetermined relative to such filtering. An example of such as system for video cameras tangentially related to the present work in that it uses previous images to suppress noise in stationary regions is U.S. Pat. No. 5,508,751 to Nitta (1996), but it does not teach or suggest the defect detection method.

3 OBJECTS AND ADVANTAGES

Accordingly, the present invention has as its object defect detection without the need for a pristine and perfect reference object. This eliminates a source of error in the defect identification as well as making defect identification more practical and less laborious. A further advantage is that since it does away with the need for separately preparing and scanning or imaging the perfect reference target, it will in some embodiments allow continuous and dynamic identification of dust specks during the normal, day-to-day operation of the instrument. For example, no special action would have to be taken to detect dirt on the glass of a photocopier. The normal procedure of scanning documents would suffice to allow the instrument to alert the user to dirt or scratches on the glass, or for some defect compensation to be automatically and effectively employed, or both.

Methods which rely on keeping a scanner cover perfectly clean and perfectly white are not as practical because any defect in the cover will stymie defect detection. For instance, if the cover is closed forcibly on a point, such as the corner of a book, this is likely to make a dent on the cover. Any such dent will cast a shadow in the scanned image, destroying the ability to automatically detect defects. Such covers are usually fairly soft, because if they are hard they cannot press down nicely on a sample or may abrade the platen.

Additionally, in some photocopiers, the background cannot be a solid cover, because it consists of several friction belts for pulling samples across the platen.

An increasingly important but less common use of these instruments than that of copying documents and photographs is the use of scanning devices as laboratory instruments. One example of such an instrument is the 4R Technology Dirtalyzer™ v. 1.1, sold to the paper industry to measure contaminants in paper. In such usage, even more than in day-to-day photocopying, any dust or scratch on or in the instrument that corrupts the image adds inaccuracy to the measurement. In cases where the paper product to be measured is very clean, the distorting effect of dust on the scanner has been clearly observed to exceed the contaminants within the paper, making the measurement worthless.

However, a major selling point of the 4R Technology Dirtalyzer™ is its use of a specific embodiment of the present invention that alerts the user to presence of dust specks or scratches. This allows corrective action to be taken. Additionally, the offending specks are removed from the measurement, so that no inaccuracy is introduced into the measurement. Since this occurs dynamically without the need to maintain perfectly clean reference targets of any kind or even to take any particular action, this advantage has aroused some enthusiasm among paper quality testing engineers. This advantage was previously impossible in this kind of instrument.

Dynamic defect detection can also be applied to other image devices, such as charge-coupled devices (CCDs) used in telescopes, microscopes and video cameras.

4 REFERENCES NUMERALS IN DRAWING

FIG. 1

100*a–e* are five sheets of paper, containing some dirt.
200 is a scanner or photocopier lid

3

202 is a cover
204 is a scanner or photocopier
206 is a scanner or photocopier platen
208a–c are defects in the scanner glass
110a–e are digital images of the five sheets of paper
120a–e are maps of deviant regions
125 is a deviant region
130a–e are maps of defective regions
135 is a defective region

FIG. 2

10 is the start of the simple embodiment
20 is the step of initializing the parameter
30 is the step of acquiring a serially numbered image
40 is the step of creating a map of deviant regions
50 is the step of adding deviant region to a map of potential defects
60 is the step of scoring each region
70 is the step of removing obsolete regions
80 is the step of detecting high-scoring regions

FIG. 3

400 is a digital image of a typical page containing printed text
410 is a gridding of a digital image
440 is a grid cell in which some text falls
450 is a grid cell in which no text falls
420 is a grid cell map that show the total deviation of each grid cell to the closest percentage
460 is the total deviation of grid cell 440
470 is the total deviation of grid cell 450
430 is a map of active and inactive segments
480 is an inactive segment
490 is an active segment

FIG. 4

140a–e are five sheets of paper, containing some dirt.
200 is a scanner or photocopier lid
202 is a cover
204 is a scanner or photocopier
206 is a scanner or photocopier platen
208a–c are defects in the scanner glass
150a–e are digital images of the five sheets of paper
160a–e are maps of deviant regions
126 is a deviant region
127 is a deviant region
170a–e are maps of defective regions
136 is a defective region
137 is a defective region

FIG. 5

300a–300c are digital images captured by a video camera
302a–c are images of a CCD defect differing from the surrounding area
304a–c are images of a CCD defect differing from the surrounding area
310a–c are representations of active segments and deviant regions
312a–b are deviant regions
320a–c are maps of defective regions
360 is a defective region

FIG. 6

610 is the start of process of deviant region map construction
620 is the step of applying a median filter
630 is the step of subtracting the filtered image from the image
640 is the step of creating deviant regions
650 is the optional step of combining deviant regions
660 is the step of reporting the set of regions

FIG. 7

700 is the start of the preferred embodiment
705 is the initialization
710 is the step of deciding options
715 is the step of acquiring an image
720 is the optional step of qualifying the image
725 is the step of assigning a serial number to the image
730 is the optional step of dividing the image into sample-areas
735 is the optional step of excluding text
740 is the step of constructing deviant regions
745 is the optional step of excluding highly deviant regions
750 is the step of adjusting the score target value
755 is the step of processing the deviant regions into defects
760 is the step of reporting the defects found.

FIG. 8

800 is the start of the defect scoring process
810 is the step of adding deviant regions to the map of potential defects
820 is the step of applying the scoring function to each region
830 is the step of finding the high-scoring regions
840 is the step of removing obsolete regions
850 is the optional step of combining intersecting defective regions
860 is the step of reporting the high-scoring regions

5 SUMMARY

The defect detection method dynamically identifies positional defects corrupting a two-dimensional data acquisition device such as a scanner or video camera. Each time an image is acquired, it is optionally qualified to determine if it differs substantially from the last processed image. If so, it is optionally processed to exclude the non-sample area of the image. The remaining portion is then optionally processed to designate as inactive segments of high total deviation. A map of small deviant regions of high variability is constructed. These deviant regions are added to a map of potential defects. Each potential defect in this map is scored to determine if it represents a defect of the instrument. Scoring functions measure the positional correspondence of a deviant region in several images. A preferred embodiment of the scoring is to count the number of images having a deviant region overlapping the region being scored. Potential defects that have become obsolete are removed from the map of potential defects. The high-scoring regions may then be conglomerated into a map of non-intersecting defective regions. This map may be used to automatically compensate for the defects or to alert an operator to their existence and position.

6 BRIEF DESCRIPTION OF THE DRAWINGS

FIG. 1 shows the objects and products of the defect detection method.

FIG. 4 depicts the objects and products of the defect detection method employing segmentation into generally homogeneous areas.

7 DETAILED DESCRIPTION OF THE PREFERRED EMBODIMENTS

7.1 Introduction

Figure 2:
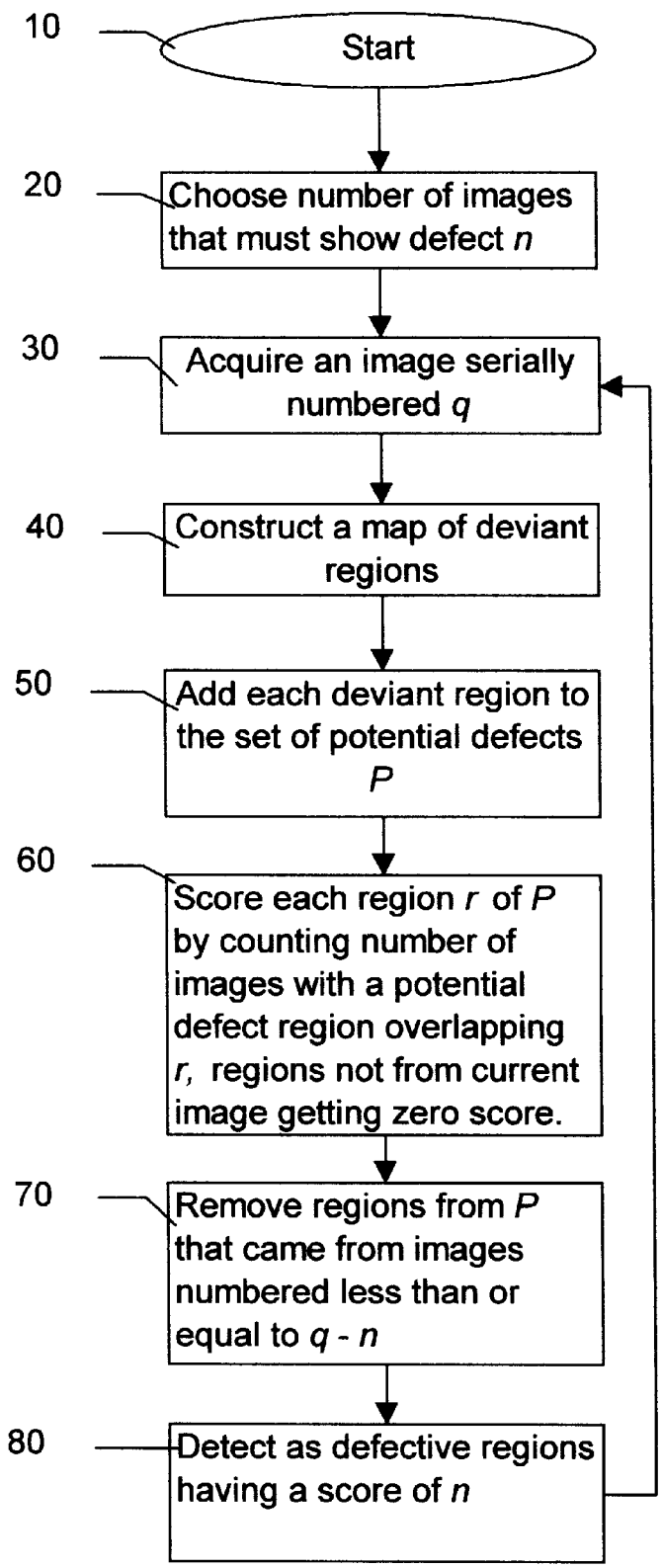
FIG. 2 is a block diagram of a simple embodiment of the defect detection method.

When a photocopier images a document, it constructs a digital image of the paper, the printing on the paper, and the imperfections in the paper. In general, the captured image also includes the edges of the paper and the portion of the photocopier cover that is not occluded by the paper. Mishmashed into these images are also any imperfections in the photocopier glass, such as dust specks or scratches. Some of these imperfections are dynamic. They come and go quickly in the day-to-day use and occasional cleaning of the instrument. However, while they exist they corrupt and damage the acquired image. Since these imperfections are part of the received images, it is theoretically possible to extract them by image processing, thereby obtaining a map of dynamic defects that can be used either to compensate for the damage the defects caused the images or to alert the operator to clean the glass.

The salient feature of such defects is that they stay put. A scratch or a dust speck stuck to the glass of the photocopier produces a corrupting mark in the same position, relative to the acquired image, in each image for as long as it exists. This specification describes a technique discerning these stationary marks from the changing mish-mash of the acquired images and thus modeling and measuring the defects associated with the instrument.

The defect detection method is a computer-related invention. It may be carried out on any and every general purpose computer communicating with an image acquisition device. Such a computer may be part of the image acquisition device that needs defect detection, or a standalone computer receiving images from such a device. The defect detection method transforms, via the image acquisition device, the energy radiated by an object or scene into a digital image, and thereafter processes the digital representation of that energy into a map of defects in or on the image acquisition device.

Section 7.2 discusses the operational theory of the defect detection method. It also discuss the choice of parameters to attain desired performance. Section 7.3 teaches a simple embodiment that is practical for photocopiers with some user actions. Section 8.4 discusses several approaches to deviant region construction. Deviant regions are used by the defect detection method discusses in Section 7.5. Section 8.6 explains why the simple embodiment described does not require the step of generating non-intersecting defects, though that is required by the more general embodiment.

The preferred embodiment is taught by Section 9. The embodiment is capable of completely automatic defect detection for a standard photocopier in day-to-day use. This embodiment requires notions of segmentation, and definitions of terms related to that is provided by Section 8.1. An overview of the general embodiment is given by Section 8.2, and depicted by FIG. 7. The step of qualifying images is discussed in Section 8.4. Two approaches to discriminating the sample area to prevent systematic error are mentioned in Section 8.6. Segmentation based on recognizing printed text and graphics is provided by Section 8.7. A more general approach to segmentation based on total deviation is taught by Section 8.8. Section 8.11 discusses the use of monotonic scoring functions. Finally, Section 8.12 explains how the choice of scoring function affects the process of maintaining the map of potential defects.

7.2 Operational Theory

Suppose that we image blank, unprinted sheets of fine white paper with an ordinary flatbed desktop flat-bed scanner such as an HP ScanJet 4C model scanner manufactured by Hewlett-Packard Co. capable of capturing about 40 million pixels of data from an ordinary sheet of paper. Fine white paper is not perfectly white, but in practice has small dark spots constituting on the order of 10 parts per million of the paper surface. These spots are randomly distributed across the surface in a uniform fashion. The probability that any given pixel of the paper surface will be dark is thus on the order of 1 in 100,000. The probability that a number n of such sheets will all be dark or deviate from the background in a given pixel location is this probability raised to the nth power, or $10^{-5 \cdot n}$. Of course, each image has $4 \cdot 10^7$ pixels. So that chance that any pixel in the image will be dark of deviant in all images is $4 \cdot 10^{7-5 \cdot n}$. If n is merely 4 this probability is less than 1 in one quadrillion. If we actually performed this experiment and found a pixel that was dark in 4 images, we would be wise to believe it far more likely that a dust speck stuck on the glass caused that pixel to be dark than that it was a coincidence.

This observation is the key to the present defect detection method. At some acceptably low chance that a false alarm will occur (the erroneous reporting of natural occurrence as an instrument defect) we prefer to be alerted to the fact that there is a defect, or to have our instrument attempt to compensate for it, than to continue including that defect in every image that we acquire. However, to do this robustly, in day-to-day operation, requires distinguishing the stationary correlations between images created by dirt and defects in our instrument from other source of systematic stationary correlation. Such sources include:

imaging the same sheet of paper many times to make many copies without moving it, printed text which causes a large percentage of image pixels to be dark or deviant, and the fact that we may image the photocopier lid instead of a sheet of paper, which of course does not change between copies and will produce stationary deviant regions.

Similar problems exist with instruments besides scanners and photocopiers. For instance, consider a telescope that uses a CCD array to digitally record an image of the night sky. Although not uniformly distributed, we do not expect to see stars in exactly the same position in two different portions of the sky. A system that detected defects in our CCD array that cause star-like spots to appear would be very beneficial. However, it must not produce a false alarm every time we take several pictures of the portion of the sky, either accidentally or by design.

The principle we rely on then can thus be stated: consistent positional correspondence between deviant regions in our image is probably an instrument defect so long as we consider only portions of the image that change from image to image and contain a relatively low ratio of deviant regions or pixels that are randomly and uniformly distributed.

Techniques for insuring that we only consider changing regions that have a low number of deviations from the background color that are randomly distributed are discussed in Section 8.

The probability of a false alarm per image tells us how many images we can expect to acquire before receiving a false alarm (i.e., $F^{-1}$). A given application should adjust the false alarm per image probability F to achieve an acceptable mean time between false alarms. If we can predict the number of deviant pixels we expect in each image, then we can easily understand the relationship between the number of images in which we demand a positional correspondence between deviant regions or deviant pixels, and simply predetermine that number according to the relationship described above to obtain a desired false alarm rate. However, the higher false alarm rate we can accept, the fewer images we must acquire before a defect is found.

In the general embodiment, scoring functions are used that offer a wider range of policies for when a defect is detected in the presence of intermittent pixel failure and portions of the image which are excluded. The false alarm per image probability is expanded to cover this case in Section 8.10.

7.3 A Simple Embodiment

For the sake of clarity a simple embodiment that does not mention those steps that are optional but expand the applicability of the defect detection method will be described in this section prior to describing other embodiments. This simple embodiment is adequate for finding defects of a photocopier using unprinted sheets of paper and taking care that only the interior of each sheet becomes part of the image. This could be a valuable procedure in itself, though the more general embodiment discussed in Section 8 eliminates the need for this special consideration on the part of the operator.

FIG. 1 depicts typical objects processed and produced by the defect detection method, the steps of which are depicted in FIG. 2. Five blank pieces of paper 100a–100e are to be acquired via a scanner or photocopier 204. These pages inevitably contain some small dirt specks, indicated in FIG. 1 by four-pointed stars exemplified by dirt speck 101 on sheet 100b. Unfortunately, the glass 206 of the scanner also has some defects 208a, 208b, and 208c, which might be pits in the glass or dust specks adhering to the glass. In FIG. 1 these defects 208a–c are symbolized by circles arranged in a triangle. Actual defects of course may be any shape. The triangular arrangement makes the glass defects 208a–c easy to distinguish from the sample defects, exemplified by defect 101. The scanner also has a lid 200 and a cover 202 which play a larger role in other embodiments. The glass defects 208a–c will obviously become part of images acquired of the pages 100a–e.

In its simplest embodiment defect detection method is conceptually simple, comprising steps depicted in FIG. 2:

Choose an appropriate value for n (step 20).
Acquire an image (step 30).
Construct the map of deviant regions for this image (step 40).
Compute a defect map for the current image by finding all regions that are defective in the n most recent images (steps 50, 60, 70, and 80).

The reader may wish to examine FIG. 1 and FIG. 2 simultaneously while reading this discussion. Step 20 is to choose a number of images in which a deviant region must appear before it can be considered a defect. This choice should be made on the basis of the kind of images acquired an acceptable false alarm probability. For the purpose of exposition and in FIG. 1, n is 3. Step 30 in FIG. 2 generates numbered digital bitmap irnages 110a–100e corresponding to pages 100a–100e in FIG. 1. These images contain images of the defects in the original pages. The defect 101 in page 100b is acquired into image 110b as a region of dark pixels 102. The glass defects 208a–c are acquired into all the images 110a–e, exemplified by regions of dark pixels 103a–c in image 110c.

Step 40 takes the raster images 110a–e and produces corresponding maps of deviant regions 120a–e via a subprocess described in Section 7.4. A block diagram of an embodiment of this procedure is provided by FIG. 6. A region is a collection of contiguous pixel positions. In general they may be an arbitrary shape although in practice they may be rectangles, and are depicted as such in FIG. 1. A deviant region is a region that differs significantly from its surrounding neighborhood. A map of deviant regions is a data structure representing a set of deviant regions. Region 125 exemplifies a deviant region in a map of deviant regions depicted by 120e. Although depicted in FIG. 1 as rectangles of the same shape, these regions would not generally have the same shape or size.

The step 50, 60, 70, and 80 are discussed in detail in Section 7.5. Collectively, they process the maps of deviant regions 120a–e to produce an ongoing dynamic map of defects in the scanner 204 for each image. Defect map 130a corresponds to the defect map produced after page 100a is scanned into image 110a processed into deviant region map 120a and processed by steps 50, 60, 70, and 80. Defect map 130e is the result of the fifth acquisition and processing. The defect maps 130a–e contain regions that have overlapped in 3 of the last 3 images. Such regions are exemplified by defect 135.

7.4 Deviant Region Map Construction

Step 40 of FIG. 2 is the computation of a set of regions that deviate significantly from their surrounding background in a raster image. These regions are those that quickly vary from the background to a significantly different intensity or color.

A number of approaches to constructing such a map are possible, such as that of U.S. Pat. No. 5,033,095 to Marcantonio (1991). Perhaps the most common is the use of a threshold, as exemplified by the Technical Association of the Pulp and Paper Industry (TAPPI) Test Method T563 (see TAPPI Test Methods, 1996–1997, TAPPI Press, ISBN 0-89852-334-6), which counts a pixel as a defect if it 10% darker than the surrounding area. However, a wide variety of other tests are possible, such as comparing the hue of a pixel rather than its brightness in a color system. One could also discriminate particularly light pixels as well as particularly dark pixels. If desired, pixels which are adjacent and determined to be defective may be conglomerated into larger regions, or each individual pixel may be considered a region by itself. This choice should be made on the basis of the number of pixels in the system and the most common defect. If the most common defect is an individual detector in a CCD array going bad, then individual pixels are best. If the most common defect is dirt on a photocopier glass, then conglomeration of defective pixels into defective regions is best.

An image may be filtered before the deviants regions are computed, although this may not be needed in all systems. This filtering should remove low-frequency components of the image and retain the high-frequency components of the image. Examples of filters that accomplish this are high-pass filters based on the two-dimensional FFT and median filters (see for example *Numerical Recipes in C,* by William H. Press, Saul A. Teukolsky, William T. Vetterling and Brian P. Flannery, Cambridge University Press, 1992. ISBN0-521-43108-5.) An additional approach is described in Appendix A of TAPPI test method T563. Space-domain filters, such as that of the TAPPI T563 test method or a median filter, may be more efficient because they don't require the computation of an FFT over the (possibly very large) image. The purpose of filtering is to remove bias in the next step set up by systematic error, such as a general lightening of the image from top-to-bottom or a general graying of the entire image from white.

Figure 6:
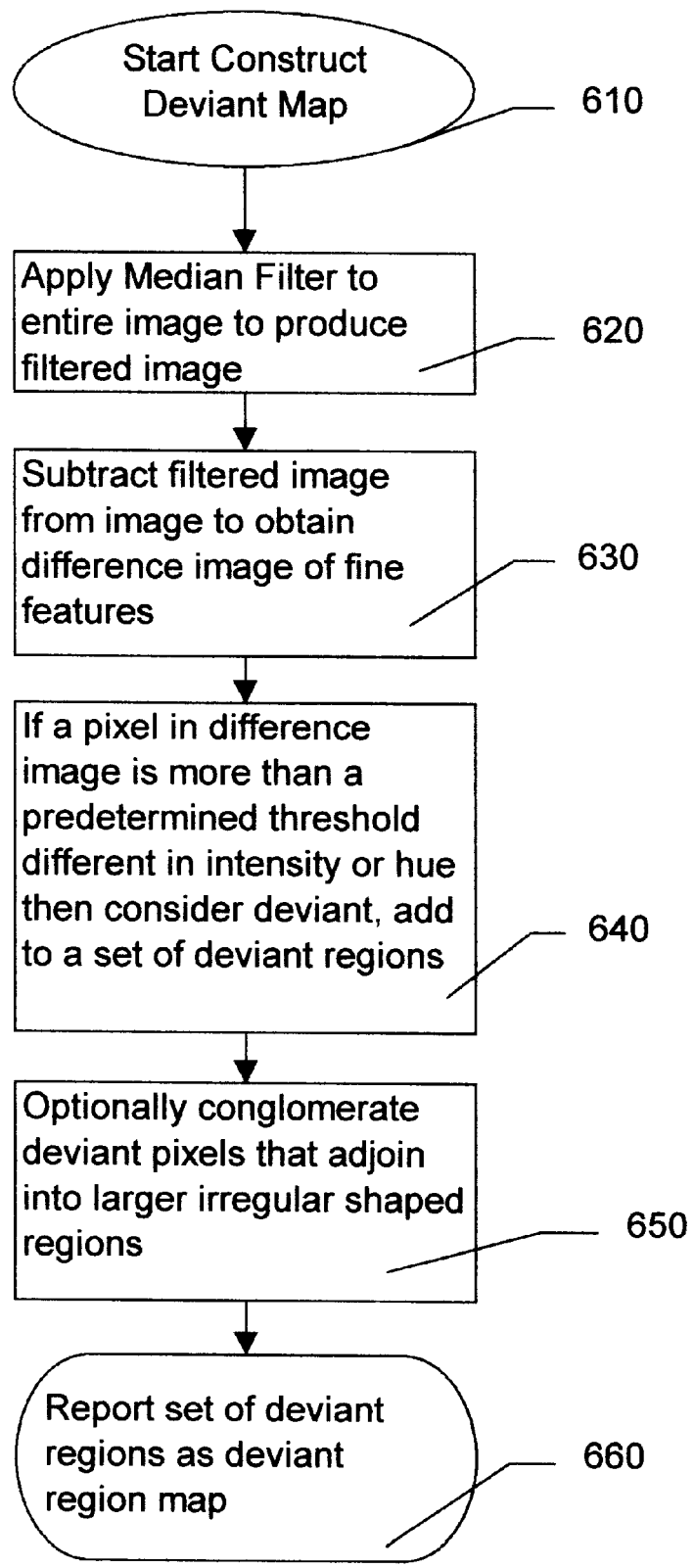
FIG. 6 shows an exemplary method of compute maps of deviant regions.

A particular embodiment of this procedure is depicted in FIG. 6. A median filter is applied to the image to construct a filtered image in step 620. This filtered image is then subtracted on a pixel-by-pixel basis from the original image to create a difference image in step 630. Then each pixel of the difference image is considered in step 640. Each pixel that has a hue stronger than a predetermined threshold or an intensity greater or less than a predetermined threshold is added to a set of deviant regions. In step 650, these pixels are optionally conglomerated into larger irregularly shaped but contiguous regions. Finally, the set of regions of pixels considered deviant is reported in step 660. In practice, optimizations are possible that can combine the filtering of step 620 and differencing of step 630 to avoid the time and space cost of materializing separate images.

In step 660 the deviant regions discovered by this process are reported back to the main prodedure of FIG. 2. A simple list or set data structure suffices for this map, as no spatial processing is required of it, in contrast to the map of potential defects described in the next section, Section 7.5.

7.5 Computing the Defect Map

The operational theory of Section 7.2 must be applied to detect defects from the map of deviant regions generated by each image. We will consider a method for accomplishing this that is more general than required for the simple embodiment, but is needed to provide the widest possible applicability for the general embodiment discussed in Section 8. The operational theory teaches that we should seek a positional correspondence between deviant regions in several images.

In order to store information about the location of deviant regions found in previously processed images, we use a map of potential defects. This map is a data structure representing deviant regions from several images. It associates an image number with each region that represents the serial number of the processed image from which the deviant region came. Additionally, it must allow rapid computation of queries of the form "return all regions that positionally correspond to a query region r." We use the term positionally corresponds to mean overlap or intersect modulo the precision of the image acquiring instrument. For the scanners and photocopiers we have studied, positionally corresponds can just mean that the two regions overlap or intersect. However, there may exists very high resolution instruments that on successive image acquisitions cannot insure that a single pixel dirt defect associated with the instrument is always in the exactly the same place. For instance, they may be some slop in the position imaged by a given pixel on different acquisitions. In such a case, the term "positionally corresponds" might have to mean "have some pixels within x distance of each other".

If the number of deviant regions is relatively low, then simple list processing and well-known efficient tests for region intersection suffices to implement a map of potential defects that rapidly can answer a query of the form "return all regions that positionally correspond to a query region r." If the image acquisition instrument demands that we define "positionally corresponds" as "being near" rather than overlapping, then we use in place of r a region d that is r grown to a larger size representing the slop in position we can expect the instrument to produce.

In general a large number of deviant regions must be processed. To expedite querying the map of potential defects, it is best to use a spatial data structure such as an R-Tree or one of its competitors that allows rapid query speed (see for example *Computer Graphics: The Principles Behind the Art and Science,* Pokorny and Cornel, Franklin, Beedle & Associates, 1989, ISIN 0-938661-0806 and *The Design and Analysis of Spatial Data Structures,* Hanan Samet, 1990, Addison-Wesley Publishing Company, Inc. ISBN 0-201-50255-0.)

In the simple embodiment described here, we detect a region as a defect by simply checking to see that a deviant region has occurred in substantially the same place in a all of predetermined number n images. This is accomplished within a framework that allows more generality by the following steps. First, the most recently computed set of deviant regions are inserted into P (step 50 of FIG. 2.) Next we assign a score to each potential defect r in P (step 60 of FIG. 2). This score will be generalized in Section 8, but here it is just a count of the number of images that produced deviant regions that positionally correspond to r. Obtaining this score for each relevant region is accomplished by taking each potential defect in the map of potential defects P in turn. Each such region r is submitted as a query to P, yielding in general a set of deviant regions from different images that positionally correspond to r. From this set and the image numbers associated with each region, we count the number of images out of the most recent n named by the regions in the set.

In this embodiment we are only interested in the most recent n images. To prevent older images from being returned and to limit the size of map of potential defects, we remove those regions that are obsolete. This is step 70 of FIG. 2. A deviant region is obsolete relative to a given scoring method when removing it from the potential map of defects never keeps a region from obtaining a target score value high enough to be considered a defect. In this case, a region r is obsolete when n images have been acquired after the image that produced r. So any region whose image number is less than the current image number minus n is obsolete.

In general, the policy for deciding when a region is obsolete depends on the scoring policy. However, a false alarm will never occur by removing a region earlier than is technically optimal, so a reasonable policy in all cases is to say that regions acquired more than images ago are obsolete. The number z should be at least the number of positional correspondence our scoring policy demands.

Finally, in step 80 we report just those regions that have a high score of the score target value or higher. In this case, the score taret value is the predetermined number n. Those regions scoring n are considered defects and report back to the main procedure.

7.6 Generate a Set of Non-intersecting Defects

The set of potential defects that received a score at least the target score value deemed to represent actual defects in the instrument. However, most simple scoring functions, such as the counting one used in this simple embodiment, will generate a number of overlapping regions that represent the same defect. A general, though optional, procedure is to combine these into a single region, so that the resulting set of defects does not contain any overlapping defects. This combination can be done by simply taking the most recent regions the set of overlapping regions, by taking the intersection of the set of overlapping regions, by taking the union of a set of overlapping regions, or some more complicated approach. In this simple embodiment, the scoring function is modified to assign a score of 0 to regions other than the most recent ones, thereby producing only the most recent regions. The embodiment of FIG. 2 therefore has no step corresponding to the combination of overlapping defects, though in the general embodiment this is depicted as Step 850 of FIG. 8. Similar optimizations are possible with most scoring functions, but depend on the particular scoring function used.

8 More General Embodiment

Although the simple embodiment described above suffices in some limited situations, a more widely applicable approach is possible and desirable. In particular, the simple embodiment can be generalized in several ways:

- To decrease systematic error, we can qualify each image as being different than the last and only operate on images qualified as different.
- We can also remove those portions of the image determined not to change with each image acquisition, such as the scanner cover not occluded by a document or perhaps the outer portion of a video image that does not image a scene through the lens.
- Rather than demanding that a predetermined number n of the most recent images have a defect at a point, we can construct a variety of scoring functions that allow some leeway in the decision as to whether or not a region is defective.
- Rather than being forced to operate on substantially blank sheets, we can detect printed or marked regions of documents and remove those highly variant regions from consideration by the algorithm.
- Similarly, regions of highly varied portions of the image can be removed from consideration as a complement to or an alternative to removing portions that clearly contain printing.
- The target score value can he adjusted in order to achieve a desired low false alarm probability based on total deviation of the portions of the image that are processed.

A source of systematic error that is easily eliminated is that an individual document may be scanned many times without being moved or changed. This will necessarily cause every defect in the sample or scene to be erroneously reported as a defect by the simple embodiment. A simple solution is to only supply the defect detection method with images that have actually changed.

A further source of systematic error is a mark on a photocopier cover that is not occluded by samples. For instance, a mark occluded by legal-size documents but not by letter-size documents will inadvertently become part of many images if care is not taken. Since such a mark will be in the same place in each image, it would incorrectly be reported as a defect in the scanner or photocopier by the simple embodiment. A solution to this problem is to exclude from consideration those portions of the image that do not genuinely represent changing samples or scenes with each new image.

Although a pit or scratch on a lens is more or less permanent, affecting each image acquired, it will often be wise to report as a defect a region that had a defect in a number k out of n, for example, 3 out of the last 5 images. Such a situation could arise when the defect in question produces pixels values that through chance are similar to the surrounding background and therefore not added to the deviant region map by the deviant region mapping subprocess. Similarly, a bad CCD pixels that failed intermittently requires such a scoring function. A wide variety of other scoring functions are possible, and mentioned below.

Similarly, given that the nature of the samples or scenes acquired may vary from quite varied and noisy to quite homogeneous, it is wise to adjust the variable k to meet a demanded maximum false alarm probability. This allows rapid defect detection on clean scenes and robust defect detection on dirty scenes.

If the image acquiring device is a scanner or a photocopier, it may be expected to operate largely on printed textual documents. In this case, explicitly locating those segments which contain printing and removing them from consideration by the method is highly practical and results in a more robust system.

Likewise, there is an implicit requirement in the simple embodiment that the scenes or images be generally homogeneous everywhere. Realistic documents and video scenes will contain large regions which are so varied as to contribute nothing to the computation of defects. Although not necessary, explicitly excluding such highly varied regions will allow more robust operation.

These generalizations may not all be required for a particular system. However, a system that embodies all of these is described below to teach a preferred embodiment that is expected to be practical, robust and widely applicable. The simple embodiment is completely subsumed by the more general embodiment.

8.1 Terms Related to Segmentation

Since we need to exclude portions the acquired images for the three reasons mentioned above (unchanging non-sample area, printed area, and highly varying area) we need some definitions. Images can be divided into segments. An active segment is one that will be considered by the method. An inactive segment is one that will not be further processed and will contribute no deviant regions. A text segment is a segment determined to contain printed matter, either in the form of graphics or text. Areas of the image that are determined not to represent a changing scene or sample, perhaps because they capture a stationary part of the image acquisition device such as a photocopier cover, are called non-sample areas.

A segment can be a region of any shape, but in practice it is convenient to confine them to rectangular shape. A region that positionally corresponds (e.g., is contained by or intersects) an active segment of an image i is said to be "active in image i." Active segments are stored in spatial data structures such as that used to implement the potential defect map so that determining whether or not a give region r is active in an image is efficient.

8.2 Overview of Action of Preferred Embodiment

This section provides an overview of the entire method that is a preferred embodiment applicable to photocopiers.

Figure 7:
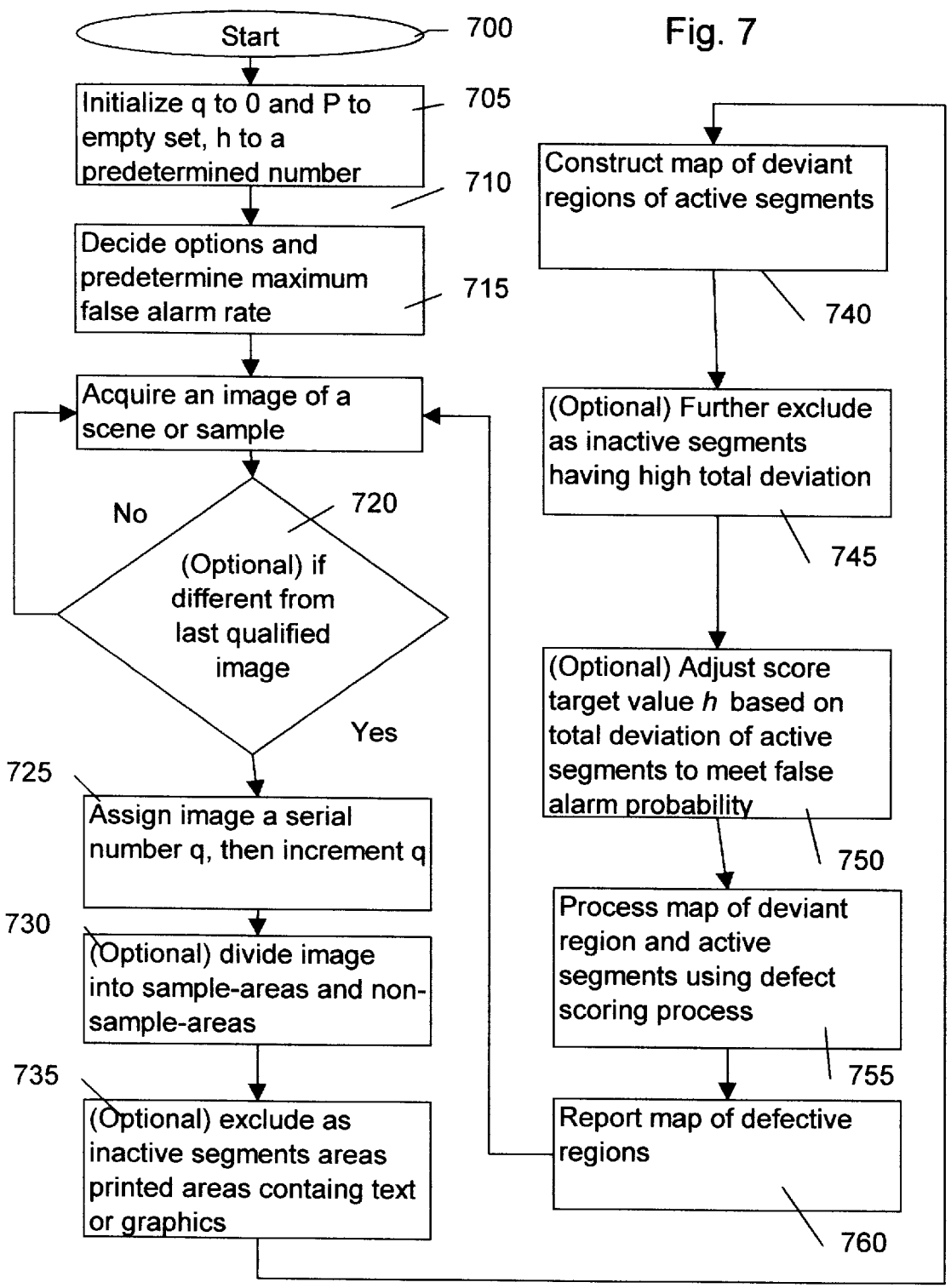
FIG. 7 is a flow chart of the entire defect detection method in its preferred embodiment, showing steps that are optional.

Individual blocks are described in greater detail where needed in the following sections. FIG. 7 is a flowchart of the preferred embodiment. Block 700 just indicates the start of the method. Block 705 handles initialization. In the embodiment described here, the "k of n" embodiment, h is set to equal to 3 for illustrative purposes. The variable n, which is implicit in the scoring function and the method of determining obsolescence, is also 3.

FIG. 4 illustrates objects and products of this process. The reader may wish to look at FIG. 7 and FIG. 4 simultaneously while reading this discussion. Documents 140a–e in FIG. 4 have dirt blobs represented by four-pointed stars in the same position as pages 100a–e in FIG. 1. However, documents 140a–e are printed, containing text in typical arrangements. Following the procedure outlined in FIG. 7, these documents are scanned in step 715. Step 720 attempts to qualify the image just acquired by determining if it differs substantially from the most recently qualified image. As can be seen by the documents 140a–e that all differ substantially, all images will be qualified in this case.

Consecutive serial numbers are assigned to each qualified image by step 725. The image is then divided into sample and non-sample areas by step 730. Non-sample areas will be designated inactive segments by this step.

Because in this embodiment the images are expected to contain text and graphics, step 735 is performed. After step 735 is performed, segmented images 150a–e have been produced. In these drawings the cross-hatched boxes are inactive segments and the generally white area, which does contain some specks as drawn, are the active segments. The inactive segments are those determined to contain printed text or graphics. The active segments in this case contain images of dirt from the original document as well as images of dirt 208a–c from the scanner glass 206. Note that many of the images of dirt specks fall in inactive segments, and will not further affect the defect detection method.

Next, deviant region maps are produced from the active segments as per step 740 in FIG. 7. These deviant region maps are depicted as 160a–e in FIG. 4. A typical deviant region is 127 in map 160c. Step 745 uses the map of deviant regions to further exclude as inactive any rectangular regions having total deviation greater than some predefined threshold. In this example, there are no such regions. Step 750 adjust the score target value h if it is warranted by the total deviation found in the active segments. In this case it is not. Finally, in step 755 of FIG. 7, the defect maps are generated which include only those regions that have been found in three of the last three images which had an active segment in that position. This process is depicted in detail in FIG. 8 and discussed below. Defect 137 in defect map 170d is generated because a deviant region overlapped it in active segments in map 160b, 160c, and 160d. Defect 136 is not generated until defect map 170e because text created an inactive segment in its position in map 160d. However, that position is active in 160e, 160c, and 160a. So of the last three image active in that position, (160a, 160c, and 160e) all three had a deviant region at that point, so defect 136 is reported in defect map 170e. This report might include indicating the position and number of defects, performed by step 760. In this example, the glass defect 208c is never found because it was too often in an inactive segment.

8.3 Overview of Defect Scoring Process

Figure 8:
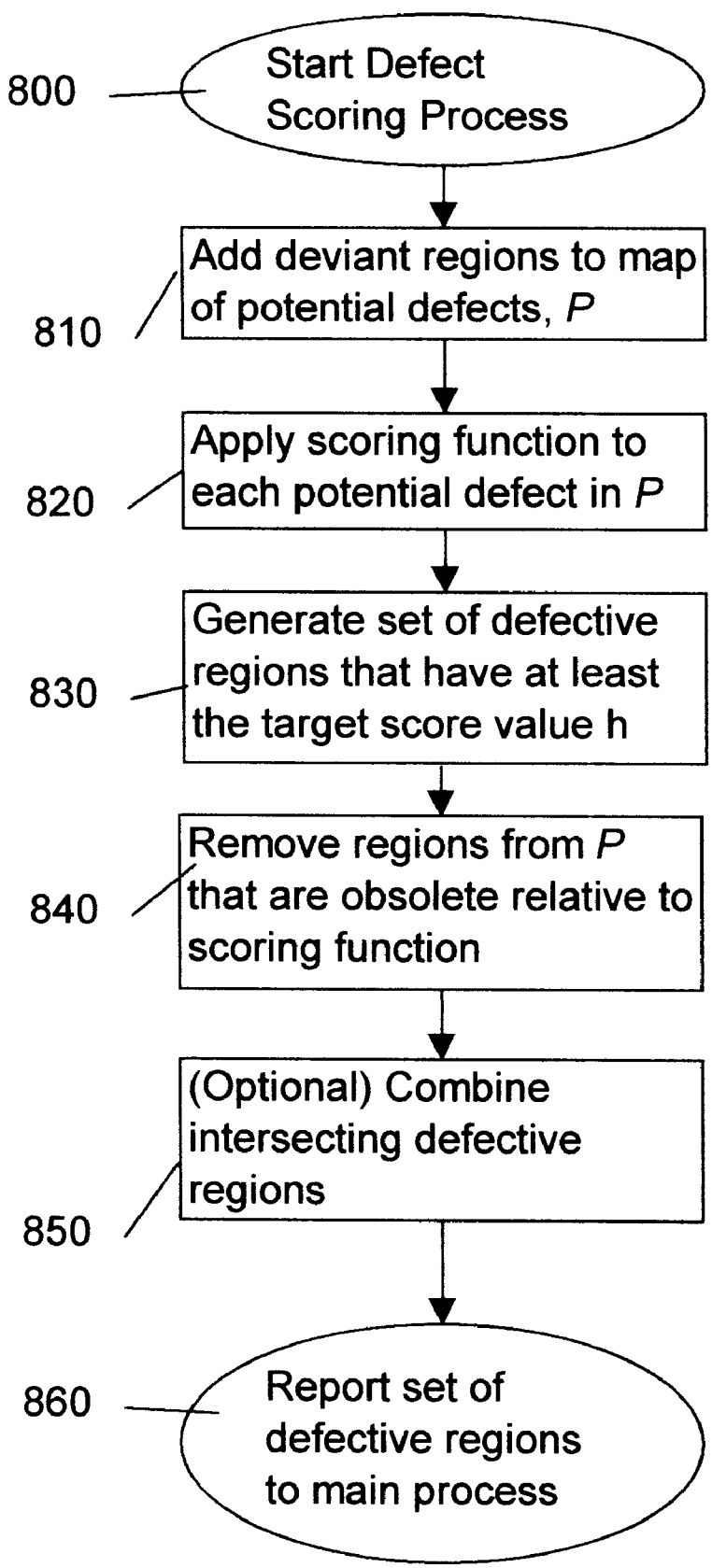
FIG. 8 shows the sub-method of computing defects from a map of deviant regions and maintaining a map of potential defects.

The Defect Scoring Process depicted by FIG. 8 is described in detail in the following sections. However, an overview of this process is provided here. Step 800 is just the start of the process, initiated by step 755 of the complete method depicted in FIG. 7. Step 810 adds the deviant regions created by step 740 of FIG. 8 to the map of potential defects. Note that along with each deviant region, its image number q is stored for later scoring and obsolescence. Recall that the map of potential defects P in the preferred embodiment is a spatial data structure such as R-Tree that supports storage of regions and supports efficient look-up of regions positionally corresponding to a query region.

In step 820, the scoring function is applied to each and every region in P. In the preferred embodiment, this function returns the count of the number of distinct images that contributed regions that positionally correspond to the region being scored. This score is then compared to the target score value h. In this example, h is 3, so a region will only be part of the reported set of defective regions if it has been found in 3 out of the last 3 images. In general however, the "k of n" embodiment supports a defect criteria of k hitting images out of the last n images that were active at that region. This scoring of defects is performed by step 830.

Step 840 removes those regions that are obsolete from P. The criteria for obsolescence depends on the scoring function and the target score value, both discussed further below. Step 850 is employed in this embodiment so that two regions that substantially overlap, thus representing the same defect, are not both reported. A good policy is simply to take the most recent region out of any set of overlapping regions. Finally, the set of combined regions from set of regions scoring h or more are reported back to main method by step 860.

8.4 Qualifying Images

The purpose of step 720 in FIG. 7 is to determine if the current image is the same as the last one. In the case of a photocopier, we may know with certainty if the sample has changed. For instance, if the current image was acquired by drawing a page from an automatic document feeder, then it is definitely different. However, scanners and photocopiers can often be used in a manual mode, in which case there may be no particular indication that the sample has moved. I therefore recommend the use of a software procedure that compares the current image with the last image analyzed. The current image is then only processed (for defect detection) if it has some feature significantly different than the last processed image. Perhaps the simplest is a pixel by pixel test with an appropriate threshold. The images are considered different if the sum of the difference between the pixel values at each point in which the pixels values differ significantly (say by 10%) exceeds a significant portion of the all the pixels (say 1%). By considering pixels in blocks, this test can be made faster.

Unfortunately, this approach does not work for a video image. Consider, for example, a video camera on a tripod focused on a television announcer. The "talking head" of the announcer moves, making the image different, but the background does not change. Thus, a small picture or nail or bump on the wall behind the announcer will be in the same position in all images. In this case, I require a signal from the video camera to indicate that the image has changed. Since modern cameras contain lots of electronic controls, this could easily be implemented by a manual action of the operator, such as pressing a button on the camera when the image has moved and the operator remembers to activate defect detection or perhaps a defect detection combined with compensation. An alternative approach is to have this signal produced by the camera itself, with no operator action. This could be accomplished by a motion detector, a change in an orientation detector, a change in a tilt detector, a significant measurement from an accelerometer, etc. Of course, all such mechanism will be defeated by combined motion of the camera and the target, for instance if the video camera is on a tripod inside a moving vehicle. However, such circumstances are rare and could be dealt with easily by simply disabling defect detection in this case.

8.5 Assigning a Serial Number

Step 725 of FIG. 7 assigns a consecutive serial number to each image. This serial number is stored by the map of potential defects with each deviant region generated by the image. It serves the purpose of identifying the image from whence a deviant region came. This is needed to determine when it can be discarded, as well as by various scoring functions.

8.6 Determining Sample Areas

The operational theory of the defect detection method demands that only changing image or image portions be considered. Some machines allow the possibility that an unchanging region will become part of each image. For example, a scanner used in manual mode to scan small, odd-sized sheets of paper may include large areas of the scanner cover 202 (FIG. 4) in each image. Such covers cannot be kept perfectly clean in day-to-day use. Any stray mark or dent in the cover will then create an unchanging deviant region in the acquired images. This will eventually be detected as a defect in the instrument.

It is therefore desirable for some image acquisition devices exclude regions of the image that show a cover or other portion of the image which does not change with each image. Step 730 of FIG. 7 depicts this operation. This may be accomplished through any of several means described in the art, such as U.S. Pat. No. 5,384,621 to Hatch et al. (1995) or U.S. Pat. No. 5,017,963 to Tuhro (1991). An even simpler mechanism used by 4R Technology is to use a black or colored cover and exclude the outer black or colored portion of the image that represents the cover. The result of this operation is a division of the image into "sample-areas" that represent an actual sample or scene and "non-sample-areas", which are everything else. If this optional step is performed, then thereafter only the sample-area portions of the images are considered. If it is not performed, the entire image is considered the sample-area.

8.7 Image Text Segmentation

Optional step 735 of FIG. 7 performs text and drawing segmentation of the sample-area of the image into generally homogeneous segments, called active, and everything else, called inactive. The purpose of this optional step is to exclude highly varying regions from consideration by the rest of the method, due to the very large number of deviant regions that they are likely to produce. This exclusion allows the number of images that must be considered by the method to obtain a reasonable false alarm rate to be a practically low number by excluding segments that have a high total deviation and would generate a high probability of overlapping deviant regions between scenes or images.

In the embodiment useful for photocopiers or scanners, this generally means removing printed text, drawings, and graphics from consideration. This may be accomplished through any of several means described in the art, such as U.S. Pat. No. 5,646,021 to Baird et al. (1997) or U.S. Pat. No. 5,335,290 to Cullen et al. (1994). In particular, photocopying of typical documents will contain a mix of pages, each of which potentially has text, drawings, or photographs in different positions. The defect detection method will identify defects more effectively if such marked or printed regions are removed from consideration in the individual regions where they occur. The segments that are determined to be unmarked sample will be called "active segments" and the rest of the image will be called "inactive". Note that it is acceptable for an entire image to be inactive, due perhaps to the fact that it is completely a photograph containing no blank space. A simpler approach for black-and-white text documents is simply to exclude those regions of an image that are dark and bigger than the smallest expected printed object, for instance a full-stop or period mark printed in a small font.

FIG. 4 depicts the action of the method of FIG. 7 employing a text segmenter.

Figure 3:
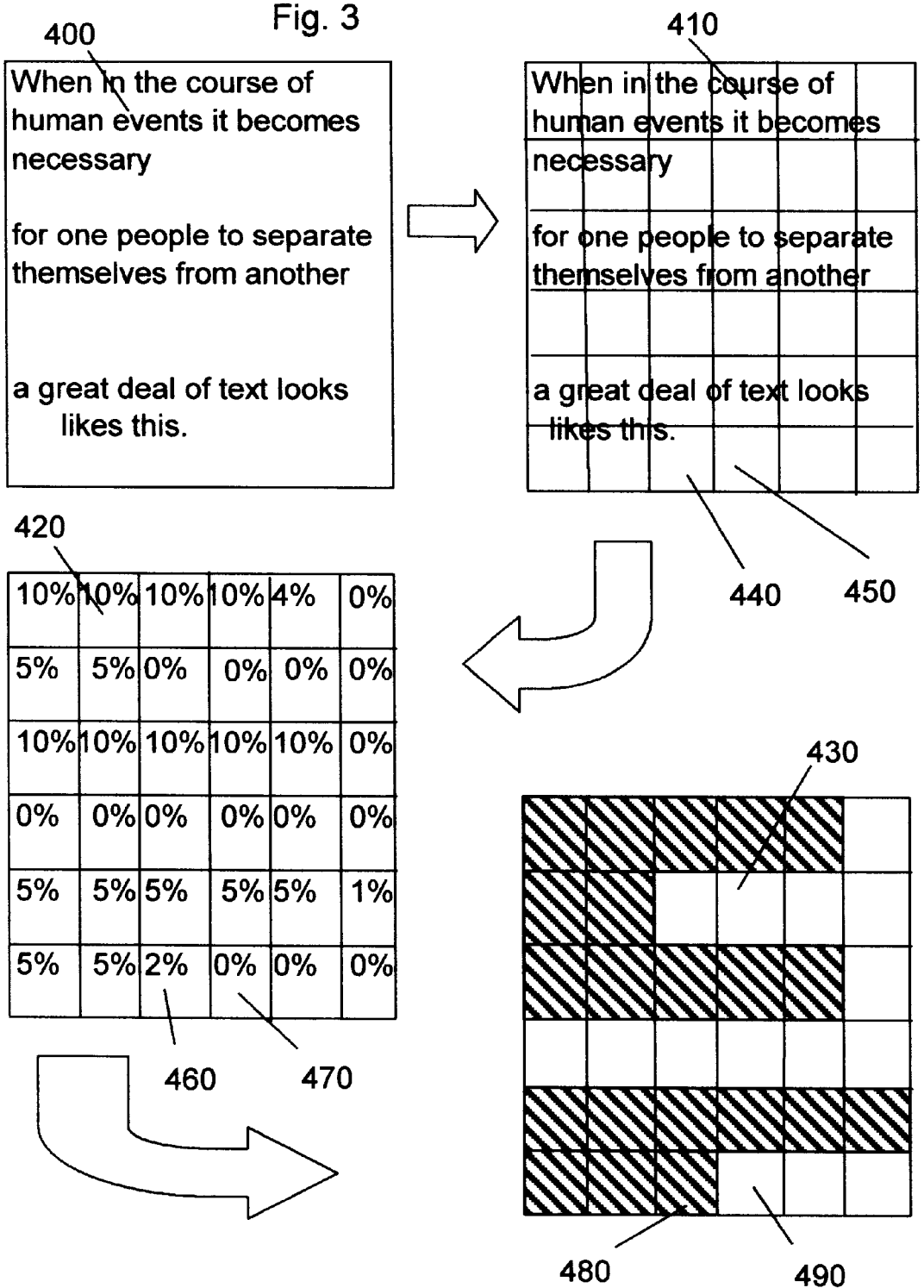
FIG. 3 depicts the object and products of a process for separating generally homogeneous areas from areas containing text or other highly variant image data.

FIG. 3 depicts an alternative approach to segmentation that computes the deviant region map first and then defines as active segments that have a low total deviation. Such a system is described in 8.8.

8.8 Segmentation Based on Total Deviation

In the case of video cameras, the segmentation systems of Baird et al. and Cullen et al., that are designed for paper documents, may not be expected to work. In such situations a more robust system is required, though we must still break the image into generally homogeneous portions. In this case, the computation of the map of deviant regions proceeds before the determination of the generally homogeneous portions. This is depicted by Block 745 of FIG. 7.

The map of deviant regions then provides a simple mechanism for determining the generally homogeneous portions, defined in terms of total deviation of a given portion. That is, any portion, such as, for instance, a grid square of predetermined size, that includes a total deviation ratio less than a predetermined value, for instance 1/10, $000^{th}$, is considered homogeneous enough to be an active segment portion. This is simple and robust, though it may have the disadvantage of requiring more computation time. This method is also applicable to photocopiers, and obviates the need for a sophisticated segmentation subsystem. The location of such rectangles or regions can proceed simply by expanding lines and computing the total deviation of the are within the lines, or by gridding up the image into blocks and considering only those blocks with low total deviation to make up the generally homogeneous regions.

FIG. 3 illustrates this procedure. An image 400 is divided into a grid 410, containing exemplary grid cells 440 and 450. Some grid cells, such as 440, will contain significant amounts of text or other quickly varying image data, such as an image of human face from a video camera. Others, such as grid cell 450, will contain mostly slowly varying pixel data that is about the same color or intensity everywhere. A map of deviant regions is computed for each grid cell separately. From these maps, the total deviation of each grid cell expressed as a percentage is computed. This can be stored as an array of percentages 420. The highly deviant regions will have a relatively high total deviation, such as cell 460. Others will have very low total deviations, such as cell 470. Finally, grid cells such as 470 that have low total deviations are considered generally homogeneous and become part of active segments, typified by segment 490, and grid cells with significantly high total deviations are considered inactive segments, typified by 480.

8.9 Example of Total Deviation Segmentation

Figure 5:
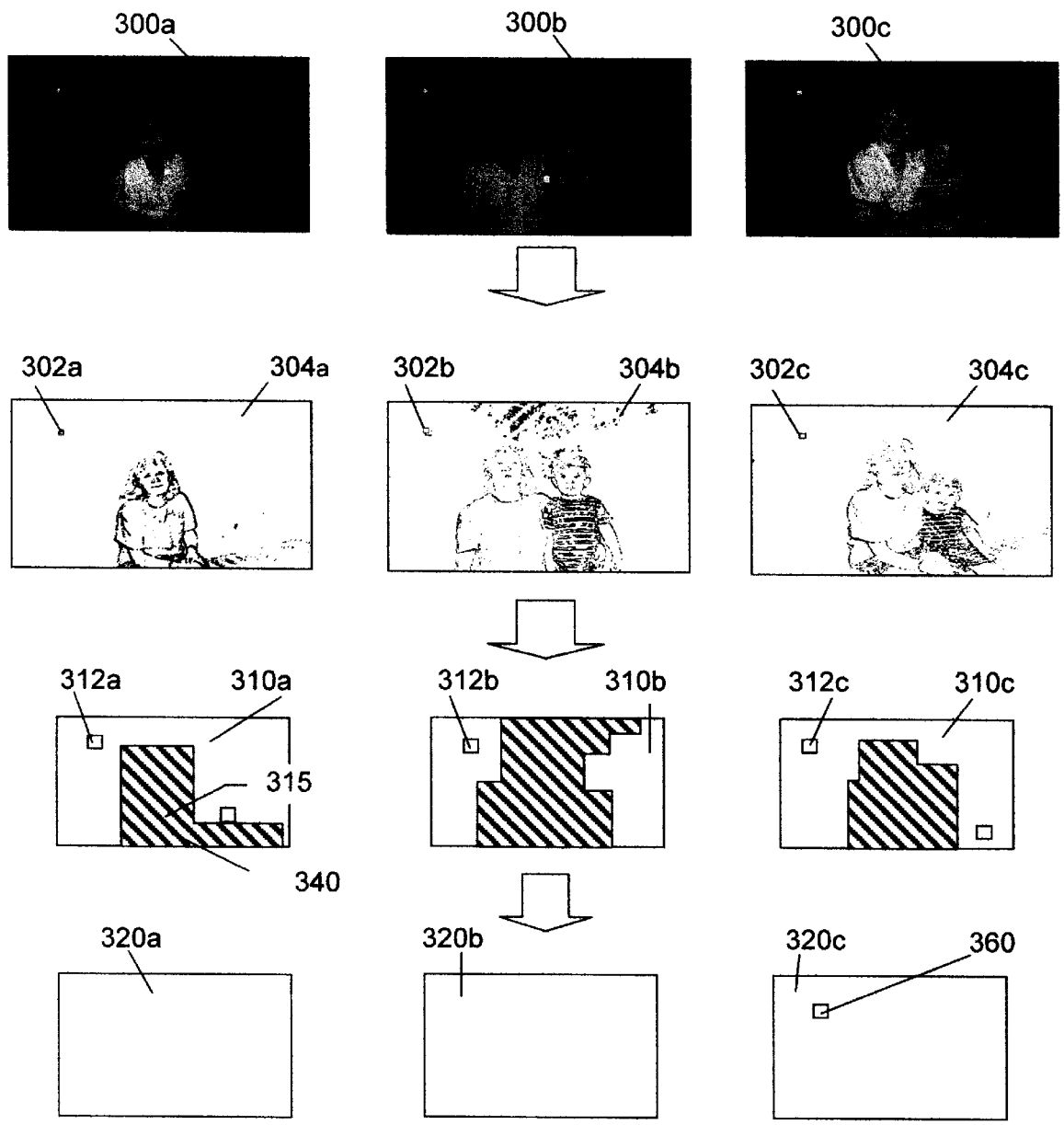
FIG. 5 depicts the objects and products of the defect detection method applied to still or motion video images rather than images of documents and an alternative segmentation technique.

FIG. 5 depicts video images and the data objects produced by them by the defect detection method of FIG. 7 employing this alternative method to segmentation based on total deviation. Still or video photographs 300a–c, perhaps qualified by the video operator pressing a button on the camera or a motion detector built in to the video camera, are acquired by step 715 of FIG. 7. Since a text segmenter is inappropriate in such a system, the optional step 735 would not be employed. A map of deviant regions is made of each image. In FIG. 5 these maps produced by step 740 in FIG. 7 are depicted by 304a–c to show that they represent highly varying regions of the images. Map 304a corresponds to image 300a, etc. Then active segments are created from areas that have a low total deviation in step 745 of FIG. 7. The active segments of the maps 310a–c are the white backgrounds, and the inactive segments are crosshatched, typified by 340 in map 310a. Note that in this case a speck in the upper left corner of the image, numbered 302a–c in images 304a–c and 312a–c in 310a–c, is in the same position in each image and a candidate for detection as a defect in the camera. Other specks, such as 315, are not repeated and will not be so detected. The final defect reports 320a–c are generated by step 760 of FIG. 7. The third defect report generated, 320c, has a single defect 360, assuming that the variables n and k are both 3, and the "k of n" scoring function is employed.

8.10 Adjusting the False Alarm Rate Dynamically

In the simple embodiment, no dynamic adjustments were made to modify the false alarm probability F. However, a system may benefit by such an adjustment based on the measured dirt or total deviation in the images or the active segments of those images. In FIG. 7, such an adjustment is made in step 750. In the exemplified embodiment, this adjustment is accomplished by adjusting the number of images k that must contain an overlapping region in order for that region to be considered defective. This "k of n" embodiment is preferred because it allows a direct relationship with the false alarm rate to be utilized. In the "k of n" embodiment, the target score value h is the number of demanded images k, though this will not be true of all scoring functions.

There are times when we would be wise to not demand that every image of the last n contain a defect at a particular position. For instance, a dust mote might only create a problem in the red color channel, which would only create a deviation detectable against some sample segments. Similarly, if a detector in a CCD array fails intermittently, it might rarely fail 10 times in a row, but commonly fail 5 out or 10 times, allowing us effective defect detection. For this reason we may choose to set k to be a fraction of n, such as for instance one-half of n. We may still choose to demand a maximum false alarm probability. If we assume a total deviation ratio of each scene is the same number P, then the probability that a given pixel will be falsely detected as a defect is given by PIX(n,k):

$$PIX(n, k) = \sum_{x=k}^{n} \binom{n}{x} \cdot P^x \cdot (1 - P)^{n-x}$$

If this per pixel false alarm rate is low so that we can neglect the probability of two bad pixels in an image, then the chance that a given image will have a false alarm is this per pixel false alarm rate multiplied by the number of pixels in the image. An estimate of the actual number of pixels can be produced by a running average of the area of the active segments, denoted by A. Then the chance F of a false alarm on a given image is approximately:

$$F = A*PIX(n,k).$$

We might therefore choose k such that F is less than a predetermined maximum false alarm rate. This can be done iteratively by simply plugging values for k into the equation defining F. Since F goes down as k goes up, it is easy to find a value for k that produce an acceptable F. If necessary, the value n used by the scoring function could also be adjusted.

If regions are allowed to be rectangles or arbitrarily shaped collections of pixels rather than a single pixel, then the computation of the probability of a false alarm is a much more complicated problem. However, I suggest in this case using the probability for the pixel-based case, possibly increased by a safety factor of 1000 or so. The basic principle that the algorithm will demand more consecutive overlaps of dirtier pages then of cleaner pages of course works in our favor, and the whole system is highly practical.

8.11 Montonic Region Scoring Functions

Step 755 of log, 7 applies a scoring function to each potential defect. A wide variety of such scoring functions are possible. We have already one seen such scoring function in Section 7.5.

A scoring function $f$ assigns a score to a region r in the map of potential defects P possibly taking into account the active segments of recent images, denoted S. This score is based on the positional correspondence of a region d to other regions in the set of potential defect P. A defect will be reported if it has a score at least h, or, stated mathematically, if $h \leq f(r,P,S)$. A preferred embodiment off $f$ is a function which counts the number of regions different than r in P that positionally correspond to r in the last n that are active at r. The target score h then represents the number of images of the last n active at a position that must have a deviant region in the same position as r for r to be considered a defect. A wide variety of other scoring functions are possible.

However, there is one critical property that any scoring function $f$ must have. When applied to two maps of potential defects P and Q that differ only in that a single region d in P is positioned so as to correspond with r but does not correspond with r in Q then we demand that $f(r,Q,S) \leq f(r,P,S)$. Such properties are commonly called monotonicity. A scoring function that is not monotonic in the positional correspondence of regions is perverse, and would never be considered. Monotonicity provides a strong limitation on allowable scoring functions.

Reasonable scoring functions include, but are not limited to:

A count of the number of images of the last k in which r is active that overlap r, A weighted sum of the regions in the last n active at r that have a region overlapping r that weights more recent images more heavily, A sum of the number of pixels overlapping r in each overlapping region, A sum of the number of overlapping pixels times the intensity of deviation of those pixels (that is, extremely dark or extremely light pixels are weighted more heavily), A statistic that decreases with the number of adjacent defects, A statistic based on the shape of the potential defect and its overlapping regions, such as one that weights eccentric regions more highly than concentric ones, and so on.

Yet another alternative approach to a scoring function would be one that computes the probability that a given potential defect represents an actual defect. This is perhaps the most elegant method possible. This might be reasonable in some applications where the images acquired have predictable properties. Such applications might include astronomy, where the density of stars may be largely predictable. If the images are of manufactured object in which defects are closely controlled, this might also be possible. In this case, the score target value h would just be the demanded probability, for instance 1.0 minus 1 millionth, that a detected defect be an actual defect.

8.12 Defect Removal Policy

In order to maintain the map of potential defects to a reasonable size, a policy for removing some of the regions from it must be applied in step 840 of FIG. 8. The simplest policy is to remove regions that are a certain number of qualified images out of date—that is, came from images acquired more than a predetermined number z images ago.

However, in some cases there may be superior polices. More generally, if we are demanding of a potential defect r a count of k hits in the most recent n images in which r is active, then a region is obsolete once it is active in n images more recent than the image from which the region was derived.

Instituting this policy provides a basic limit on the size of potential defects. Suppose our images have a number of pixels denoted by A and that we use the optional step of making inactive segments that have a total deviation above a certain threshold t. Then in the worst case t·A potential defects must be stored. If we assume the space taken up by each defect in the map is at worst a constant c for a single pixel region, then maximum space required for defects is c·t·A·n. Reasonable values for these variables might be an image area of 100 million pixels, a threshold t of 1/1000, a value for n of 5 images, and a value for c of 20 bytes. The potential defect map would at most take up 10 million bytes in this case. At the time of this writing that seems extravagant, but can be expected to become trivial in a few years. A wide variety of applications exists today which are much easier: CCD images have closer to 4 million pixels, and a threshold t of 1/10,000 would work fine for clean white printing paper. Also, deviant regions being individual pixel is the worst case for this analysis, as regions shapes can be stored much more compactly than a similar sized group of individual pixels, so c might be much less than 1.0 in practice.

This allows us to set aside, either in a general purpose computer or in a memory that is part of an image acquistion apparatus, a fixed storage that will not be exceeded by this algorithm. This is another indicaion that the "k of n" embodiment is best.

9 Conclusion, Ramifications and Scope

This defect detection method allows automatic dynamic detection of dirt, dust, and scratches on the glass of photocopiers and scanners or defects in the CCD arrays of video cameras. No special action is required of the operator, and no special object, such as an unblemished target, is required. It thus simplifies the operation and improves the images produced by such machines by reliably detecting and reporting such defects.

While the above description contains many specifics for the sake of clarity, it should not be construed as limitations on the scope of the defect detection method, but rather as an exemplification of several preferred embodiments. In particular, once a scoring function is chosen equivalent optimized embodiments become straightforward. More generally, a wide applicability to instruments and situations is possible.

For example, the defect identification method can be usefully employed in video cameras. In such an instance, a majority of the images captured would not yield any sufficiently homogenous segments to be counted as active. However, when indoors, simply pointing the camera occasionally at a typical relatively smooth wall would suffice to provide the method a sufficient number of generally homogeneous images to identify defects. This process could occur passively, or the operator could choose to identify defects by intentionally aiming the camera at such images. Out-of-doors, the sky provides a convenient generally homogeneous background, even if starry or partly cloudy.

CCD arrays such as those used in video cameras are also employed in telescopes and other scientific instruments, and hence the defect identification method can be employed on such devices as well. Since defects are disastrous in such instruments and the scenes or samples they target are very easily controlled, the defect identification method may be very useful in such instruments. Similar arrays of defect-susceptible detectors are also used for infrared imaging.

Accordingly, the scope of the invention should be determined not by the embodiments illustrated, but by the appended claims and their legal equivalents.

9.1 Limitations on the Usefulness of the Defect Detection Procedure

The strengths of a technology can often best be understood by considering its weaknesses. Accordingly, this section discusses what the defect detection procedure cannot do.

Because it relies on probability, it can only assure an extremely low probability of falsely detecting a defect, rather than eliminating all such possibility. Because it requires the comparison of many images, it cannot detect a defect instantly, but only after several qualified images have been acquired. It follows that a defect that comes and goes quickly, such as a dust most that is laid down in one image and wiped away by the next, cannot be detected. Similarly, a defect cannot be detected unless it falls in a generally homogeneous area in a series of images. Thus, if the images are always "busy" at a certain spot, that is, always containing text or edges, then defects in that region cannot be detected. For instance, all U.S. Patents contain nearly the same text in the top margin of each page. The photocopying of a U.S. Patent would not be able to detect defects in that region, but would be delayed until by chance documents that are blank in that area are scanned. Similarly, the dense text of the a patent would not allow defect detection in that area on those pages, though the Sheets on which drawings appear might well contain enough blank spaces to allow defect detection in those areas.

In certain simple embodiments the method can detect large defects. However, if the option of segmenting the image into inactive and active samples is used either by the total deviation method or by the text segmentation method, then only relatively small defects can be detected. Large defects will in such circumstances generally be considered inactive segments and therefore no defects will be found therein. Of course, large defects are catastrophic and clearly noticeable, so detecting them is not as important as detecting the small speckles which plague photocopiers and scanners.

In photocopying, a defect that makes a region light, rather than dark, would not be detected unless documents with dark and solid regions fell over it. This is not typical of photocopied documents (for instance, solid black space is forbidden in the drawings of patents, and, since it uses lots of ink, discouraged in other documents.)

In video cameras, the detection depends on moving the camera. A fixed surveillance camera, for instance, could not apply this technique, as the scene it captures is never moved.

Automatic defect detection also applies to CCD arrays such as used in microscopes, telescopes, and video cameras. However, most of the defects in CCD arrays may be permanent manufacturing defects detectable or correctable at the factory and dynamic defects in such devices may be relatively rare.

It is important to recall that defect detection is very valuable even if it only works a portion of the time. For instance, a pit or scratch on the glass of a photocopier is a permanent defect. It will eventually be found by the variety of documents used, or by simply scanning blank pages. Finding such defects, even if it occurs weeks after the defect first occurs, is surely better than not finding them at all. It must also be born in mind that a significant advantage of this method is that it works without requiring any pristine object of calibration.

I claim:

1. A method of dynamically detecting defective regions of an image acquisition device that are corrupted by dirt or defects positionally associated with said image acquisition device comprising the steps of:
   a) initializing a score target value h to a predetermined number,
   b) initializing a map of potential defects P that associates with each defect the number of the image in which it was found,
   c) acquiring a serially numbered image numbered q from said image acquisition device,
   d) constructing a map of deviant regions from image number q that includes just those regions having at least a predetermined deviation of intensity or color from the surrounding area in said image,
   e) adding each deviant region from said map of deviant regions and its image number q to P.
   f) scoring each region r in said map of potential defects with a scoring function that is monotonic in positional correspondence between r and other regions P having image numbers differing from q,
   g) removing from P regions obsolete relative to said scoring function,
   h) detecting as defective regions just those regions that scored at least said score target value h,
   i) repeating steps c through h;
   whereby the operator may be alerted to the existence and position of defective regions, or said defective regions may be removed from or compensated for in the acquired images.

2. The method of claim 1 further including the step of qualifying said image numbered q by determining if substantial difference exists between said image numbered q and the most recent previously qualified image and wherein only qualified images are processed further.

3. The method of claim 1 further including the step of qualifying said image numbered q image by receiving a signal from said image acquisition device and wherein only qualified images are processed further.

4. The method of claim 1 further including the step of excluding non-sample areas from said image numbered q by means for discriminating sample-areas.

5. The method of claim 1 further including the step of designating as inactive segments of the image that contain text or graphics found by means for text segmenting and excluding inactive segments from further processing.

6. The method of claim 1 further including the step of designating as inactive those segments having at least a predetermined total deviation and excluding inactive segments from further processing.

7. The method of claim 1 further including the step of adjusting said score target value h based on the total deviation to attain a predetermined target false alarm.

8. The method of claim 1 wherein said deviant regions are limited to individual pixels.

9. The method of claim 1 further including the step of combining intersecting defective regions into non-intersecting regions before being reported.

10. The method of claim 9 wherein the scoring function counts the number of images out of the most recent n that have active segments positionally corresponding to r and that have a deviant region positionally corresponding to r, and n is a predetermined number.

11. The method of claim 10 further including the steps of:
   a) qualifying said image numbered q by determining if substantial difference exists between said image numbered q and the most recent previously qualified image and wherein only qualified images are processed further,
   b) excluding non-sample areas from said image numbered q by means for discriminating sample-areas,
   c) designating as inactive those segments having at least a predetermined total deviation and excluding inactive segments from further processing.

12. A program storage device readable by a machine, tangibly embodying a program of instructions executable by the machine to perform method steps for dynamically detecting defective regions of an image acquisition device that are corrupted by dirt or defects positionally associated with said image acquisition device comprising the steps of:
   a) initializing a score target value h to a predetermined number,
   b) initializing a map of potential defects P that associates with each defect the number of the image in which it was found,
   c) acquiring a serially numbered image numbered q from said image acquisition device,
   d) constructing a map of deviant regions from image number q that includes just those regions having at least a predetermined deviation of intensity or color from the surrounding area in said image,
   e) adding each deviant region from said map of deviant regions and its image number q to P,
   f) scoring each region r in said map of potential defects with a scoring function that is monotonic in positional correspondence between r and other regions P having image numbers differing from q,
   g) removing from P regions obsolete relative to said scoring function,
   h) detecting as defective regions just those regions that scored at least said score target value h,
   i) repeating steps c through h;
   whereby the operator may be alerted to the existence and position of defective regions, or said defective regions may be removed from or compensated for in the acquired images.

13. The program storage device of claim 12 further including the step of qualifying said image numbered q by determining if substantial difference exists between said image numbered q and the most recent previously qualified image and wherein only qualified images are processed further.

14. The program storage device of claim 12 further including the step of excluding non-sample areas from said image numbered q by means for discriminating sample-areas.

15. The program storage device of claim 12 further including the step of designating as inactive segments of the image that contain text or graphics found by means for text segmenting and excluding inactive segments from further processing.

16. The program storage device of claim 12 further including the step of designating as inactive segments having at least a predetermined total deviation and excluding inactive segments from further processing.

17. The program storage device of claim 12 further including the step of combining intersecting defective regions into non-intersecting regions before being reported.

18. The program storage device of claim 17 wherein the scoring function counts the number of images out of the most recent n that have active segments positionally corresponding to r and that have a deviant region positionally corresponding to r, and n is a predetermined number.

19. The program storage device of claim 18 further including the steps of:
   a) qualifying said image numbered q by determining if substantial difference exists between said image numbered q and the most recent previously qualified image and wherein only qualified images are processed further,
   b) excluding non-sample areas from said image numbered q by means for discriminating sample-areas,
   c) designating as inactive segments having at least a predetermined total deviation and excluding inactive segments from further processing.

20. An apparatus dynamically detecting defective regions of an image acquisition device that are corrupted by dirt or defects positionally associated with said image acquisition device comprising:
   a) means for initializing a score target value h to a predetermined number,
   b) means for initializing a map of potential defects P that associates with each defect the number of the image in which it was found,
   c) means for acquiring a serially numbered image numbered q from said image acquisition device,
   d) means for constructing a map of deviant regions from image number q that includes just those regions having at least a predetermined deviation of intensity or color from the surrounding area in said image,
   e) means for adding each deviant region from said map of deviant regions and its image number q to P.
   f) means for scoring each region r in said map of potential defects with a scoring function that is monotonic in positional correspondence between r and other regions P having image numbers differing from q,
   g) means for removing from P regions obsolete relative to said scoring function,
   h) means for detecting as defective regions just those regions that scored at least said score target value h,
   whereby the operator may be alerted to the existence and position of defective regions, or said defective regions may be removed from or compensated for in the acquired images.

\* \* \* \* \*